Oct. 21, 1924.
J. LEDWINKA
1,512,113
CHANNEL STRUCTURE FOR TONNEAU PANELS
Filed Feb. 27, 1919
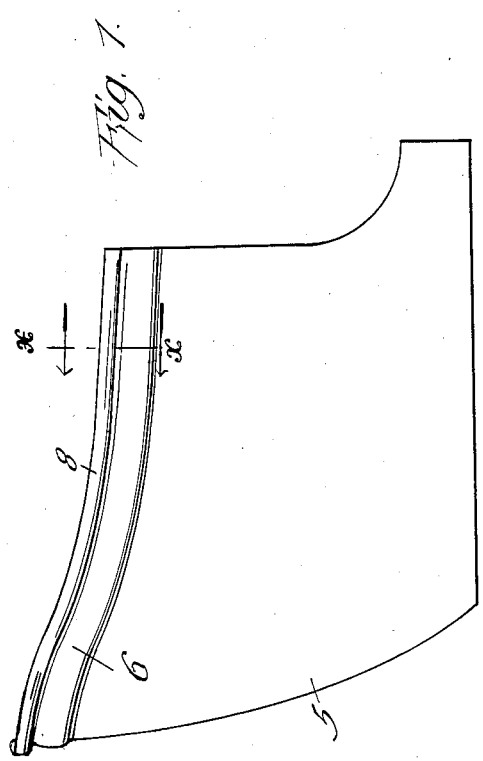
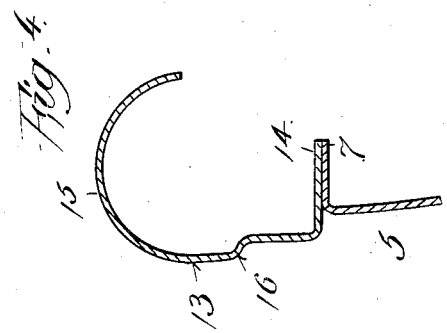
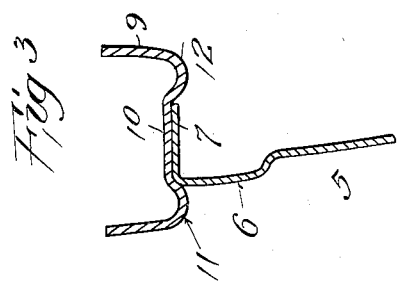
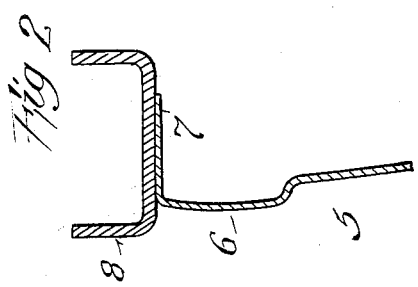
Inventor
Joseph Ledwinka
by his atty Samuel E. Darby Patented Oct. 21, 1924.

1,512,113

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CHANNEL STRUCTURE FOR TONNEAU PANELS.

Application filed February 27, 1919. Serial No. 279,588.

*To all whom it may concern:*

Be it known that I, JOSEPH LEDWINKA, a citizen of the United States, residing at Philadelphia, county of Philadelphia, State of Pennsylvania, have made a certain new and useful Invention in Channel Structures for Tonneau Panels (Case A), of which the following is a specification.

This invention relates to channel structures for tonneau panels, and particularly to the structure of channels employed at the upper edge of a tonneau or seat back panel for automobiles.

The object of the invention is to provide a channel structure for the upper edge of a tonneau or seat back panel to form a neat and sightly appearing finish for such upper edge, and at the same time to afford a convenient means for the application and attachment of the upholstery to the panel.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Fig. 1 is a view in side elevation of an automobile tonneau or seat back panel having a channel structure applied thereto in accordance with my invention.

Fig. 2 is a broken view in vertical section through the upper edge of the panel, on the line X, X, Fig. 1.

Figs. 3 and 4 are views similar to Fig. 2 showing modified channel structures embodying my invention.

In the drawing reference numeral 5 designates a tonneau or seat back panel for automobiles. This panel may be of any suitable material and may be bent and shaped to any desired shape, style or outline. A sheet steel panel well serves the purpose. At its upper edge the panel 5 is bent or deflected outwardly, as indicated at 6, to form a ridge or bead, and the extreme edge 7 thereof is bent over inwardly to form a flange. This bent over flange 7 is employed to form a support for a channel member 8. This channel member is stamped up out of sheet steel and is bent or curved in the direction of the length thereof to conform to the curvature of the tonneau or seat back, and said channel member 8 may be secured to the flange 7 by spot welding or otherwise, as may be desired.

The channel member 8 is shown in Fig. 2 as being U-shaped in cross section, the base thereof resting flatwise upon the flange 7.

In Fig. 3 the channel member 9, while of generally U-shape in cross section, is formed with an upwardly pressed longitudinally extending portion 10 in the central portion of its base and the flange 7 is received flatwise in the depressed seat formed on the under surface of said base by said upwardly pressed portion. This formation produces the rounded corners 11, 12, which present a curved contour and lend a degree of finish and ornateness, which, in some cases may be desired. As in the structure shown in Fig. 2 the open channel of the channel member faces upwardly thereby forming a seat to facilitate the application and attachment of the upholstery which is ordinarily applied to the tonneau and seat back panels of automobiles.

In the construction shown in Fig. 4 the channel member 13 instead of being U-shaped in cross section, is formed at one edge with a laterally extending flange 14 which rests flatwise upon and is secured to the lateral flange 7 of the panel 5. The member 13 is pressed into generally oval shape in cross section with the inner side, or a portion thereof, omitted, thereby producing a curved dome-like structure indicated at 15, with an entrance opening in its inner side to afford facilities for applying and attaching the upholstery. This form of channel member presents a continuously rounded or curved upper surface and finish, which is distinctive and in some cases, may be desired, according to the individual tastes of the manufacturer or user of the automobile. It is obvious that the member 13 may be formed or stamped up with any desired longitudinal configuration for ornamentation or for increasing the strength thereof, such, for example, as the offset shoulder 16.

While I have shown in Figs. 2 and 3, the panel 5 as formed with the offset 6 adjacent its upper edge, this feature is not necessarily essential and in Fig. 4 I have shown this offset feature omitted.

From the foregoing description it will be seen that I provide an exceedingly simple, neat and sightly channel structure for the upper edge of a tonneau or seat back panel for automobiles, which is strong and durable, which affords a very convenient means for applying and attaching the upholstery to the panel, and which can be readily and easily applied.

Having now set forth the objects and nature of my invention and various constructions embodying the same, what I claim as new and useful, and of my own invention, and desire to secure by Letters Patent, is,—

1. The combination with a sheet metal panel bent or stamped into the shape and curvature to form the sides and back of a tonneau or seat, and having an inturned flange at its upper edge, of an upholstery receiving member of substantially U-shape in cross section and longitudinally bent or stamped to conform to the contour of the panel, said member having its base applied and secured to said inturned flange and its open channel facing upwardly to form a seat for the upholstery.

2. The combination with a sheet metal panel bent or stamped into shape to form a tonneau or seat back of an automobile body, and having an inturned flange at its upper edge, of a channel member of substantially U-shape in cross section and longitudinally bent or stamped to conform to the contour of the panel, and having an upwardly pressed longitudinally extending depression in the under surface of its base to receive said flange, said channel member and flange being secured together.

3. The combination with a sheet metal panel bent ito the shape and curvature to form the sides and back of a tonneau or seat, said panel having an outwardly pressed portion or bead adjacent its upper edge, said upper edge terminating in an inturned laterally extending flange, of a channel shaped upholstery receiving member having its base applied and secured to said inturned flange and having the channel thereof arranged to form a seat for the application and attachment of upholstery thereto.

In testimony whereof I have hereunto set my hand on this 24th day of February, A. D. 1919.

JOSEPH LEDWINKA.